Patented Sept. 9, 1947

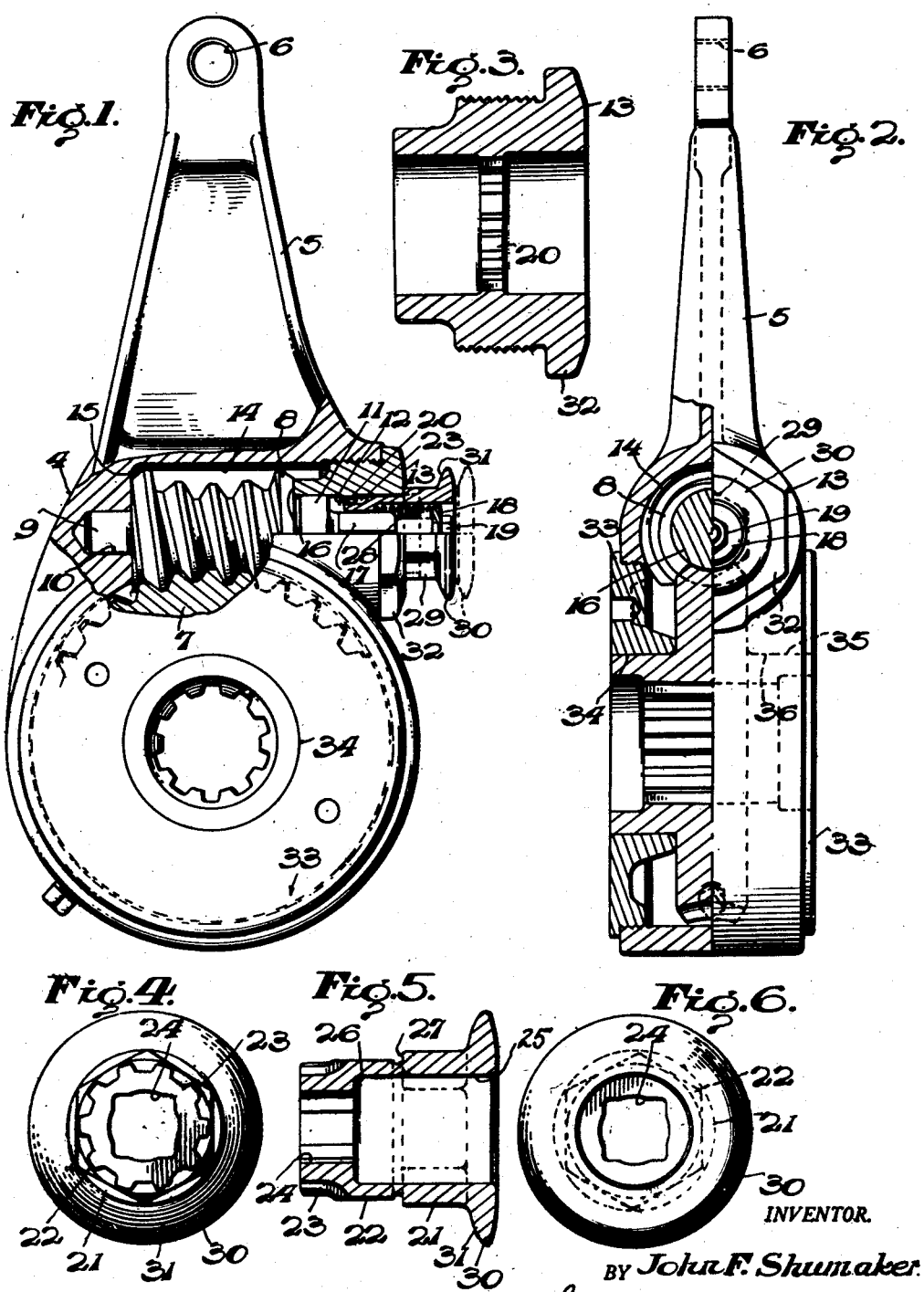

2,427,310

UNITED STATES PATENT OFFICE 2,427,310

LOCK FOR BRAKE SLACK ADJUSTERS

John F. Shumaker, Elyria, Ohio, assignor to Bendix-Westinghouse Automotive Air Brake Company, Elyria, Ohio, a corporation of Delaware Application March 28, 1944, Serial No. 528,438

7 Claims. (Cl. 74—527)

This invention relates to brake operating mechanism for vehicles, and more particularly to a brake slack adjusting device of the worm gear type.

It has previously been proposed to utilize slack adjusters of the above type having a casing provided with a worm wheel mounted on the brake cam shaft, a worm in engagement with the worm wheel for adjusting the position of the worm wheel relative to the slack adjuster body and a spring-pressed detent for maintaining the worm and worm wheel in any desired position. Brakes provided with slack adjusters of this type have been operated by means of an actuator connected to a lever arm on the slack adjuster body, but considerable difficulty has been experienced in some cases, particularly in connection with slack adjusters subjected to high torques, due to backing off of the slack adjuster due to the torque exerted on the worm by the teeth of the worm wheel, and it is accordingly an object of the present invention to provide positive means for locking the worm, and consequently the worm wheel, in any desired brake adjusting position.

A further object of the invention is to provide positive locking means in a slack adjuster of the above type which will permit ready adjustment of the slack adjuster.

A still further object of the invention is to provide locking means for a slack adjuster of the above type, so constituted as to insure automatic unlocking of the worm when an adjusting wrench or tool is applied to the adjusting nut of the slack adjuster.

Yet another object of the invention is to provide positive and efficient locking means for a slack adjuster of the above type of simplified and economical structure.

These and other objects and novel features of the invention will appear more fully hereinafter from the following detailed description when taken in connection with the accompanying drawing. It is to be expressly understood, however, that the drawing is employed for purposes of illustration only and is not designed as a definition of the limits of the invention, reference being had for this purpose to the appended claims.

In the drawing wherein similar reference characters refer to similar parts in the several views:

Fig. 1 is an end view of a slack adjuster, partially in section, constructed in accordance with the principles of the present invention;

Fig. 2 is a side view, partially in section, of the slack adjuster shown in Fig. 1;

Fig. 3 is a sectional view of a retaining member for the slack adjuster worm;

Fig. 4 is an end view of the adjusting member shown in Fig. 1 as viewed from the left in that figure;

Fig. 5 is a sectional view taken along the axis of Fig. 4; and

Fig. 6 is a view of the adjusting nut shown in Fig. 4 taken from the opposite end.

Referring to the drawing, and more particularly to Fig. 1, the slack adjuster is illustrated as including a body 4 provided with a brake lever 5 having a bore 6 at its upper end adapted to be connected with the clevis of a brake actuator rod not shown. A worm wheel 7, adapted to be splined to a brake operating cam shaft in well-known manner, is mounted for rotation in the body in a conventional manner, as more fully illustrated in Fig. 2 of the drawing, and is positioned to mesh with a worm 8 spaced axially from the axis of the worm wheel and in a plane at right angles thereto, the worm being mounted for rotation in the housing by means of a shaft portion 9 engaging a bore 10 in the housing at the left end of the worm, and a bearing portion 11 engaging a bore 12 formed in a retainer member 13 threadedly received in a bore 14 formed in the housing as shown. A shoulder 15 at the left end of the bore 14 and a shoulder 16 on the left end of the retainer nut serve to position the worm as shown, and to prevent axial movement thereof. The worm 8 is provided with a squared portion 17 extending to the right from the bearing portion 11, a further extension of the shaft to the right being of reduced diameter and provided with a collar 18 retained thereon by means of a nut 19 threadedly mounted on the worm shaft. As shown in Fig. 3, the central portion of the bore 12 of the retainer member is provided with internally formed teeth or splines 20. An adjusting member 21, shown more particularly in Fig. 5, is provided with a cylindrical portion 22 adapted to slide and rotate in the bore 12, the left end of the member being provided with externally formed splines or teeth 23 adapted to engage with the teeth 20. The central portion of the member is provided with a squared bore 24, as more particularly shown in Figs. 4 and 6, this bore being adapted to engage the squared portion 17 of the worm shaft in order to insure rotation of the member with the shaft and to permit axial movement of the member along the shaft. An enlarged bore 25 is formed in the member in the right end of the squared portion 24 as shown in Fig. 5, a shoulder 26 being formed in the left end of the bore 25 as shown.

During assembly of the slack adjuster, the worm wheel, worm and worm retainer member are assembled as shown, the worm retainer member being provided with relatively fine threads in order to allow the member to be tightly drawn into the body of the slack adjuster in order to prevent rotation of the retainer member relative to the bore, and as a further precaution, prick-punch marks may be made if desired at the junction of the member and bore in order to prevent reverse rotation of the nut. The adjusting nut 21 may be inserted in the bore 12 and onto the squared portion 17 of the worm, axial movement of the member to the left after the teeth 20 and 23 have been engaged being prevented by means of a shoulder 27 formed on the member. A spiral spring 28 is then inserted in the bore 25 of the member and is retained in position between the collar 18 and the shoulder 26 of the member by means of the member 19 on the right end of the worm shaft, the spring being so tensioned as to normally maintain the adjusting member in the position shown in solid lines in Fig. 1, the teeth on the adjusting member thus being in engagement with the internally formed teeth of the retaining member 13 to prevent rotation of the adjusting member therein and consequently to prevent rotation of the worm and worm wheel. Flat surfaces 29 are formed on the outer portion of the adjusting member to receive an end wrench of conventional type, and a shoulder 30 is formed on the right end of the adjusting member and is provided with a cam surface 31 in opposed relation to a similar cam surface 32 formed on the right end of the retainer member 13. The parts are so dimensioned that with the retainer member in the position shown in solid lines in Fig. 1, an end wrench of standard design, not shown, applied to the member for the purpose of adjusting the slack adjuster, will first engage the cam surfaces 31 and 32 in order to cam the member to the right to the position shown in dotted lines, in order to disengage the teeth 20 and 23, prior to engagement of the jaws of the wrench with the flat surfaces 29 of the adjusting member. Thus when the adjusting wrench is completely engaged with the surfaces of the member, the teeth and worm are free to turn in the housing for adjusting the position of the worm wheel therein in accordance with the desire of the operator. On removal of the wrench, the member is urged to the left by the spring 28 to effect engagement between the teeth 23 and 20, and in the event these teeth fail to register properly, the operator can readily turn the adjusting member slightly in either direction in order to effect such registration, wherein the spring serves to move the member to the left in order to complete the engagement of the teeth. With regard to the assembly of the worm wheel in the slack adjusting housing, it will be noted on reference to Fig. 2 that a nut 33 threadedly received by the housing receives a hub portion 34 formed on the left side of the worm wheel, a similar hub portion 35 on the right side of the worm wheel being carried in a bore 36 formed on the right side of the housing as viewed in that figure.

It will be readily understood by those skilled in the art, that due to the angularity of the teeth on the worm and worm wheel, any force applied to the lever arm 5 will tend to cause rotation of the worm, and in order to insure against such rotation when the teeth 20 and 23 are engaged, it would be understood that these teeth are so shaped as to prevent any tendency of the member to be forced out of engagement with the internal teeth 20 of the retainer member 13 when torque is exerted on the worm. The arrangement shown is efficient and relatively simple to manufacture, and due to the arrangement of the cam surfaces 31 and 32, means have been provided for automatically disengaging the locking teeth in order to unlock the adjusting member. In the event an end wrench of standard design is not available to the operator for turning the adjusting member, it will be apparent that he can readily move the member 21 to the right by hand in order to permit the wrench to engage the flat surfaces 29 of the adjusting member.

While one embodiment of the invention has been illustrated and described with considerable particularity, it is to be understood that the invention is not restricted thereto, but is capable of receiving a variety of expressions, some of which will now readily suggest themselves to those skilled in the art, while changes may be made in the details of construction and arrangement of parts, and certain features used without other features, without departing from the spirit of the invention. Reference is, therefore, to be had to the claims hereto appended for a definition of the limits of the invention.

What is claimed is:

1. In a brake slack adjuster of the type comprising a body having a brake lever, a worm wheel supported for rotation in said body, a worm supported for rotation in said body and in engagement with said worm wheel, and means for rotating said worm and for normally positively preventing rotation thereof in either direction including a worm adjusting member mounted for rotation with said worm and movable axially with respect thereto, the improvement which comprises a plurality of teeth carried by the body, a plurality of teeth formed on the member and adapted on axial movement of the member in one direction to engage the first named teeth for positively preventing rotation of the member and worm, resilient means for moving the member in said one direction to effect and maintain engagement of said teeth, and a cam surface formed on a portion of the member adapted on application of an adjusting wrench to the member to insure movement of the latter axially to disengage said teeth and permit rotation of said member and worm.

2. In a brake slack adjuster of the type comprising a body having a brake lever, a worm wheel supported for rotation in said body, a worm supported for rotation in said body and in engagement with said worm wheel, and means for rotating said worm and for normally positively preventing rotation thereof in either direction including a worm adjusting member mounted for rotation with said worm and movable axially with respect thereto, the improvement which comprises a plurality of teeth carried by the body, a plurality of teeth formed on the member and adapted on axial movement of the member in one direction to engage the first named teeth for positively preventing rotation of the member and worm, resilient means for moving the member in said one direction to effect and maintain engagement of said teeth, and cam surfaces formed on a portion of said body and on a portion of said member adapted on application of an adjusting wrench to the member to insure movement of the member axially to disengage said teeth and permit rotation of said member and worm.

3. In a brake slack adjuster of the type comprising a body having a brake lever, a worm wheel supported for rotation in said body, a worm supported for rotation in said body and in engagement with said worm wheel, and means for rotating said worm and for normally positively preventing rotation thereof in either direction including an adjusting member mounted for rotation with the worm and movable axially with respect thereto, the improvement which comprises a plurality of internal teeth formed on a portion of the body, a plurality of external teeth formed on a portion of the member and adapted for engagement with the teeth on the body for positively preventing rotation of the member, and a spring interposed between said member and a portion of said worm for moving said member axially to normally effect and maintain engagement of said teeth.

4. In a brake slack adjuster of the type comprising a body having a brake lever, a worm wheel mounted for rotation in said body, a worm having a shaft mounted for rotation in said body, said worm being in engagement with said worm wheel, a worm retaining element threadedly received by the body, and a worm adjusting member mounted on said worm shaft for rotation therewith and movable axially thereon, the improvement which comprises a collar carried by the shaft for limiting axial movement of said member thereon in one direction, and means for normally positively preventing rotation of said member and worm shaft in either direction including a plurality of internal teeth formed on said element, a plurality of external teeth formed on a portion of the member, and a spring interposed between said collar and member for moving said member axially on said shaft in the other direction to effect engagement of said teeth.

5. A lock for a brake slack adjuster having a rotatable worm shaft provided with a squared portion adjacent one end, the shaft being rotatably supported at said end by a bearing member having an internal splined portion, which comprises a worm adjusting member mounted for axial movement on said shaft and having a squared bore adapted to engage the squared portion of said shaft, a collar carried by the shaft for maintaining the adjusting member thereon and for limiting axial movement of the adjusting member in one direction, external splines formed on one end of said adjusting member, and a spring interposed between said collar and adjusting member for moving the latter axially in the other direction to effect engagement of said external splines with the internal splined portion of said bearing member, whereby rotation of said adjusting member and worm shaft relative to said bearing member is prevented except on axial movement of the adjusting member to effect disengagement of said splines and internal splined portion of the bearing member.

6. A lock for a brake slack adjuster having a rotatable worm shaft provided with a squared portion adjacent one end, the shaft being rotatably supported at said end by a bearing element having an internal splined portion, which comprises a worm adjusting member mounted for axial movement on said shaft and having a squared bore adapted to engage the squared portion of said shaft, a collar carried by the shaft for maintaining the member thereon and for limiting axial movement of the member on the shaft in one direction, external splines formed on one end of the member, a spring interposed between the collar and member for moving the latter axially in the other direction for effecting engagement of said splines with the internal splined portion of the bearing element to lock the member against rotation with respect to said element, and opposed cam surfaces formed on said bearing element and member, whereby the application of an adjusting wrench to the member serves to cam the member in said one direction to disengage said splines from said internal splined portion of the bearing element to permit rotation of the member to rotate the worm and worm wheel.

7. In a brake slack adjuster of the type having a body having a worm wheel and a worm engaging said worm wheel, both mounted for rotation in the body, and means for rotating said worm to adjust the position of the worm wheel in the body and for normally locking said worm against rotation in the body including an adjusting member mounted for rotation with the worm and for axial movement along a portion thereof, the improvement which comprises cooperating internal and external teeth formed respectively on the body and member adapted for engagement in one axial position of the member to prevent rotation thereof in the body, resilient means for moving the member axially to said one position, and opposed cam surfaces formed on the body and member, whereby application of an adjusting tool to the member serves in cooperation with the surfaces to cam the member axially to another position to disengage said teeth.

JOHN F. SHUMAKER.

REFERENCES CITED

The following references are of record in the file of this patent:

UNITED STATES PATENTS

| Number | Name | Date |
|---|---|---|
| 2,156,154 | Hooker | Apr. 25, 1939 |
| 1,798,936 | Frehse | Mar. 31, 1931 |
| 2,337,756 | Larson | Dec. 28, 1943 |
| 1,843,475 | Apfelbaum | Feb. 2, 1932 |
| 711,443 | Sharp | Oct. 14, 1902 |
| 2,214,730 | Jeffers | Sept. 17, 1940 |

FOREIGN PATENTS

| Number | Country | Date |
|---|---|---|
| 132,591 | Germany | July 10, 1902 |
| 24,801 | Great Britain | Oct. 28, 1909 |
| 401,379 | Germany | Sept. 4, 1924 |